United States Patent [19]
Udelle et al.

[11] Patent Number: 5,634,435
[45] Date of Patent: Jun. 3, 1997

[54] ANIMAL AMUSEMENT AND EXERCISE STIMULATOR

[76] Inventors: Steven D. Udelle; Laura L. Udelle, both of 26414 Barranquilla Ave., Punta Gorda, Fla. 33983

[21] Appl. No.: 354,275

[22] Filed: Dec. 12, 1994

[51] Int. Cl.⁶ ............................................. A01K 29/00
[52] U.S. Cl. ................................. 119/706; 119/707
[58] Field of Search .................................. 119/706, 707; 446/168, 169, 173, 236

[56] References Cited

U.S. PATENT DOCUMENTS

| | | | |
|---|---|---|---|
| 2,413,831 | 1/1947 | Jordan | 446/236 X |
| 3,721,035 | 3/1973 | Goldfarb | 446/169 X |
| 5,163,863 | 11/1992 | Goldfarb et al. | 446/236 |

*Primary Examiner*—Robert P. Swiatek

[57] ABSTRACT

An animal amusement and exercise stimulator comprising a circular housing 14, containing a closed circuit trough 18 around its outermost perimeter. The trough 18 is inclined upwards from concealed portion 32 to exposed portion 34 and confines a movable object 16 within. A motorized mechanism is concealed within the housing 14 and is comprised of a motor 20, motor output shaft 22, propulsion arm 28 including a paddle 30, and a plurality of actuating arms 23 and 24, employed for operating motor reversing switch 26.

11 Claims, 1 Drawing Sheet

5,634,435

ANIMAL AMUSEMENT AND EXERCISE STIMULATOR

FIELD OF THE INVENTION

The present invention relates to animal amusement devices, and more particularly to a combination animal amusement and exercise stimulator device, that continuously moves an object back and forth within an orbital path. The continuous movement of the object provides a compelling attraction to an animal, whereby an animal will frequent the device on its own initiative more often, thereby improving its physical condition, health, mental alertness and amusement, through its own efforts.

BACKGROUND DISCUSSION OF THE PRIOR ART

Animal toys and amusement devices have a movable object on, around, or within these devices. An animal is usually shown by demonstration the movable or rolling object in the device, whereby the animal's inherent instinct to attack or play with the moving object is imminent. However, these objects have to be initially moved by an animal or a human to begin with, and unfortunately, a good device becomes unused for long periods of time and just occupies space. Cats can easily become obese, bored, and listless from lack of amusement and exercise over a period of time. The prior art more closely associated to the present invention is U.S. Pat. No. 4,722,299, by Mohr, Feb. 2, 1988, which shows a toy with a closed loop or track, containing a loose ball inside the track housing. The ball is captive within the housing and is exposed to the continuous opening of the inside edge of the track. A cat can swat the ball around the track through the opening with its paw. U.S. Pat. No. 5,269,261, by McCance, Dec. 14, 1993, shows a similar device to Mohr, wherein the ball is visible at the top of the track, and the center portion of the loop contains a replaceable, corrugated cardboard scratching pad. The above described devices have dormant, movable objects when not in use. The prior art does not teach on the use of a motivational means that would exhibit an irresistable incentive or attraction to an animal, whereby the animal would benefit from increased use of the device. The present invention takes advantage of the inherent instincts of an animal's response to a moving object, when the original movement of the object is not physically initiated by the animal or human hand, but by the device.

SUMMARY OF THE INVENTION

Generally, the present invention is comprised of a circular housing, containing an inclined, U-shaped trough, or gutter confining a ball shaped lure within. The circular housing has a carpeted platform affixed at its top, concealing a portion of the U-shaped trough, thereby creating a hide and seek scenario for the ball shaped lure. A motorized mechanism concealed below the carpeted platform cover is comprised of a motor, motor output shaft, an elongated propulsion arm mounted at a right angle to the motor output shaft, and including a plurality of short, reversing switch actuating arms. When the motor is energized, the propulsion arm sweeps, or propels the ball shaped lure from the concealed U-shaped trough area out and around the exposed trough area, and back into the concealed area. The propulsion arm stops short of exposing itself when one of the actuating arms contacts the reversing switch, thereby reversing the motor and repeating the sweep or propulsion of the returned lure in the opposite direction. This back and forth event is continuous. If a cat stops the lure and then releases it, the lure will return to the concealed propulsion arm because of the inclined trough. This alternating exposure of the travelling lure is exciting to a cat.

It is therefore an object of the present invention to provide an animal amusement and exercise stimulating device that does not require an animal or a human hand to initiate the movement of the lure.

It is another object of the invention to activate the device when the animal is in its most active period, two to three times a day, for a duration of thirty minutes each.

It is an object of the invention to have an animal expend its surplus energy at scheduled intervals, thereby developing improved muscle tone, alertness, coordination, and better sleeping habits.

It is an object of the invention that upon activation of the device, a cat will always respond to the moving lure.

It is another object of the invention that the exercise stimulator would relieve the animal from boredom, by providing amusement, thereby saving areas of household furniture from damage.

Another object of the invention is that an enticement, such as catnip, would no longer be required.

Other objects and advantages may be readily determined by the following descriptions.

COMPLETE DESCRIPTION OF THE INVENTION

Figure 1A:
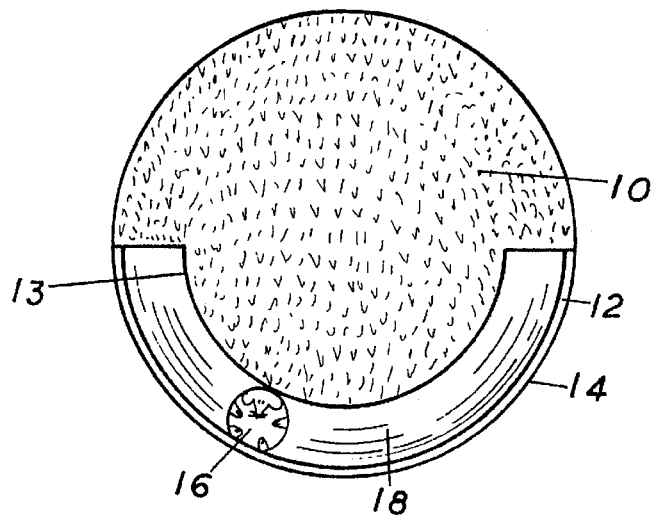
FIG. 1a is a top plan view of the device showing a carpeted platform cover, partially exposing a trough or gutter, confining a ball shaped lure within.

FIG. 1a is a plan top view of the present invention, comprised of a circular housing 14, a carpeted platform cover 10 affixed to a portion of outer edge 12 and concealed inner edge 13, including a movable object, or ball shaped lure 16 confined within a closed circuit U-shaped trough or gutter 18.

Figure 1B:
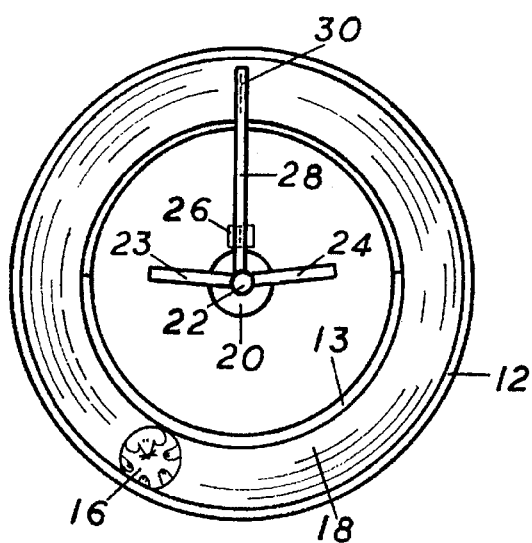
FIG. 1b is a plan top view with the carpeted platform cover of FIG. 1a removed, showing a motorized mechanism.

FIG. 1b is a plan top view with the carpeted platform cover 10 of FIG. 1a removed, exposing concealed mounting edges 13 and 12 and a motorized mechanism comprised of a motor 20, motor shaft 22, a double pole, double throw motor reversing switch 26, a plurality of actuating arms 23 and 24, and a propulsion or sweep arm 28 with a paddle blade 30, shown in hidden lines, affixed to the bottom edge of propulsion or sweep arm 28.

Figure 1C:
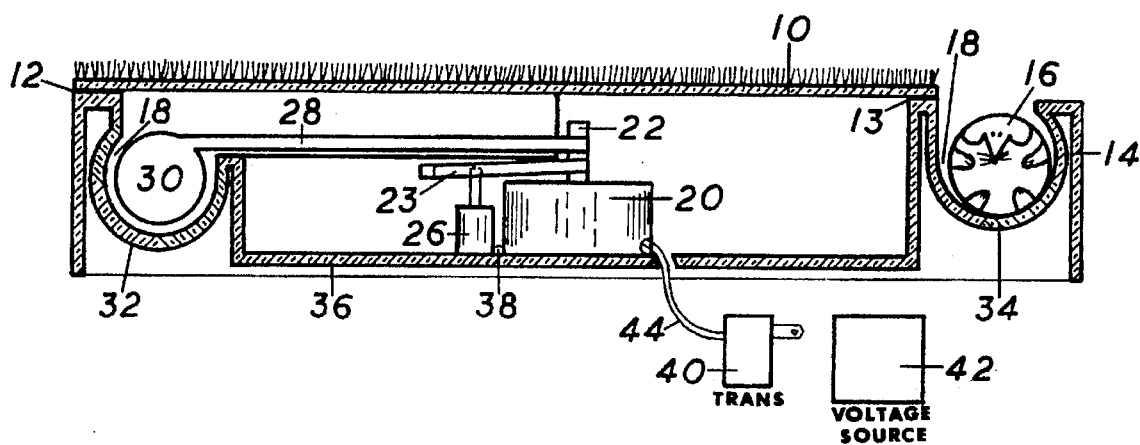
FIG. 1c is a side plan view showing the position of each component in detail.

FIG. 1c is a side plan view of the device housing in cross section, showing the position of the components within the interior of the device, comprised of a circular housing 14, containing the closed circuit U-shaped gutter or trough 18 around its outermost perimeter. The closed circuit U-shaped trough 18 is inclined upwards from its concealed portion 32 to its exposed portion 34 and confines the movable object or ball shaped lure 16 within. The circular housing 14 has the carpeted platform cover 10 affixed to housing top edges 12 and 13, concealing a portion of the U-shaped trough 18, thereby creating a hide and seek scenario for the ball shaped lure 16. The motorized mechanism concealed below the carpeted cover 10 is comprised of motor 20 affixed by fasteners 38 to housing base 36, motor output shaft shaft 22, the elongated propulsion or sweep arm 28 including the paddle 30 at one end mounted at a right angle to the motor output shaft 22, and the plurality of actuating arms 23 and 24. Referring to FIGS. 1b and 1c, when the motor is energized from voltage source 42, via transformer/plug 40 and connecting wires 44, the propulsion arm 28 sweeps or propels the ball shaped lure 16 from the concealed portion of trough 18 counterclockwise, out, and around the exposed portion of trough 18, and then back into the concealed trough area. The propulsion arm paddle 30 stops short of exposing itself when the actuating arm 24 (not shown in FIG. 1c), contacts the reversing switch 26, thereby reversing the motor, and repeating the sweep or propulsion of the returned lure 16 in a clockwise orbit. This back and forth orbiting event is continuous. If a cat stops the lure and then releases it, the lure will return to the concealed propulsion paddle from the upper trough incline 34 to the lower trough incline 32 by itself, ready to be propelled around again. This alternating exposure of the orbiting lure is exciting to an animal. The motor RPM works effectively between 20 and 40 RPM.

CONCLUSION

Thus, it has been shown that the animal amusement and exercise stimulator can perform all of the objectives as outlined above. Many other variations are possible, for example: it would be obvious to those skilled in the art that may consider using magnetic force fields to induce object movements in lieu of mechanical propulsion or a combination thereof, intermittent powered motors to create a stop and go lure movement, lures of different shapes, or using sensors, such as heat or motion to automatically activate the device, or electronic sound synthesizers. While the above descriptions may contain many specific details, these should not be construed as limitations on the scope of the invention, but rather as examples of embodiments or modifications, herein detailed in accordance with the descriptive requirements of law. It should be understood that the details are to be interpreted as illustrative and not in a limiting sense.

We claim:

1. An animal amusement and exercise stimulator comprising:
    a housing forming a base and having a lower surface, a vertical peripheral sidewall extending from said lower surface, and an upper surface supported by said peripheral sidewall;
    a shaft disposed below said upper surface of said housing and means for rotating said shaft disposed within said housing, said rotating means causing said shaft to rotate one revolution clockwise and one revolution counterclockwise repeatedly; and
    a continuous annular track encircling said vertical peripheral sidewall, said annular track having an open top portion to provide access to the interior thereof and a closed said top portion for concealment therein of said annular track; and
    an object disposed within said annular track and freely movable therein; and means for propelling said freely movable object causing said object to move within said annular track and orbit back and forth therein.

2. The device of claim 1, wherein said housing is circular in cross-section and said annular track comprises a trough-shaped annular ring.

3. The device of claim 1, wherein said means for rotating said shaft comprises a motor mechanism.

4. The device of claim 1, wherein said means for propelling said freely movable object comprises an elongated arm mounted to said shaft at an angle therewith supporting a paddle affixed at the end of said arm remote from said shaft, said arm mounted to said shaft disposed within said housing and said paddle affixed to said arm disposed within said annular track.

5. The device of claim 4, wherein said shaft further includes an actuating means.

6. The device of claim 5, wherein said shaft includes a pair of actuating arms each able to momentarily contact their respective side of an electric motor reversing switch.

7. The device of claim 1, wherein said freely movable object is a ball.

8. The device of claim 1, further comprising said continuous annular track having an inclined floor surface, said inclined floor surface being higher at said open top portion of said annular track and lower at said closed top portion of said annular track, whereby said freely movable object therein will always return for concealment to said closed top portion of said annular track.

9. The device of claim 1, wherein said upper surface of said housing includes means for permitting an animal to stretch its claws thereon and thus function as a scratching pad for said animal.

10. An animal amusement and exercise stimulator comprising:
    a circular housing forming a base and having a lower circular planar surface, a vertically oriented peripheral sidewall extending from said lower surface, and an upper circular planar surface supported by said peripheral sidewall, said upper surface of said housing including means for permitting an animal to stretch its claws thereon and thus function as a scratching pad for said animal;
    a shaft disposed below said upper surface of said housing and having an upper and a lower end;
    a motor mechanism disposed within said housing and coupled to said lower end of said shaft;
    a reversing switch wired to said motor for reversing the direction of rotation of said motor disposed within said housing;
    a continuous annular track encircling said vertically oriented peripheral sidewall, said continuous track having an open top portion to provide access to the interior thereof and a closed said top portion for concealment therein of said annular track;
    a ball disposed within said continuous track and freely movable therein; and
    an shaft mounted to said upper end of said shaft at a right angle therewith and disposed within said housing and having a paddle affixed to an end of said arm remote from said shaft, said paddle disposed within said continuous track and concealed by a partially closed said open top portion, said shaft employing an actuating means for operating said reversing switch causing said motor mechanism to operate clockwise and then counterclockwise in a continuous fashion, thereby propelling said ball by said paddle back and forth within said continuous annular track.

11. The device of claim 10, further comprising said continuous annular track having an inclined floor surface being higher at said open top portion of said annular track and lower at said closed top portion of said annular track, whereby said freely movable object therein will always return for concealment to said closed top portion of said annular track.

* * * * *